March 29, 1960
E. A. QUADE
2,931,023
DIGITAL POSITION INDICATOR
Filed Feb. 14, 1955
2 Sheets-Sheet 1
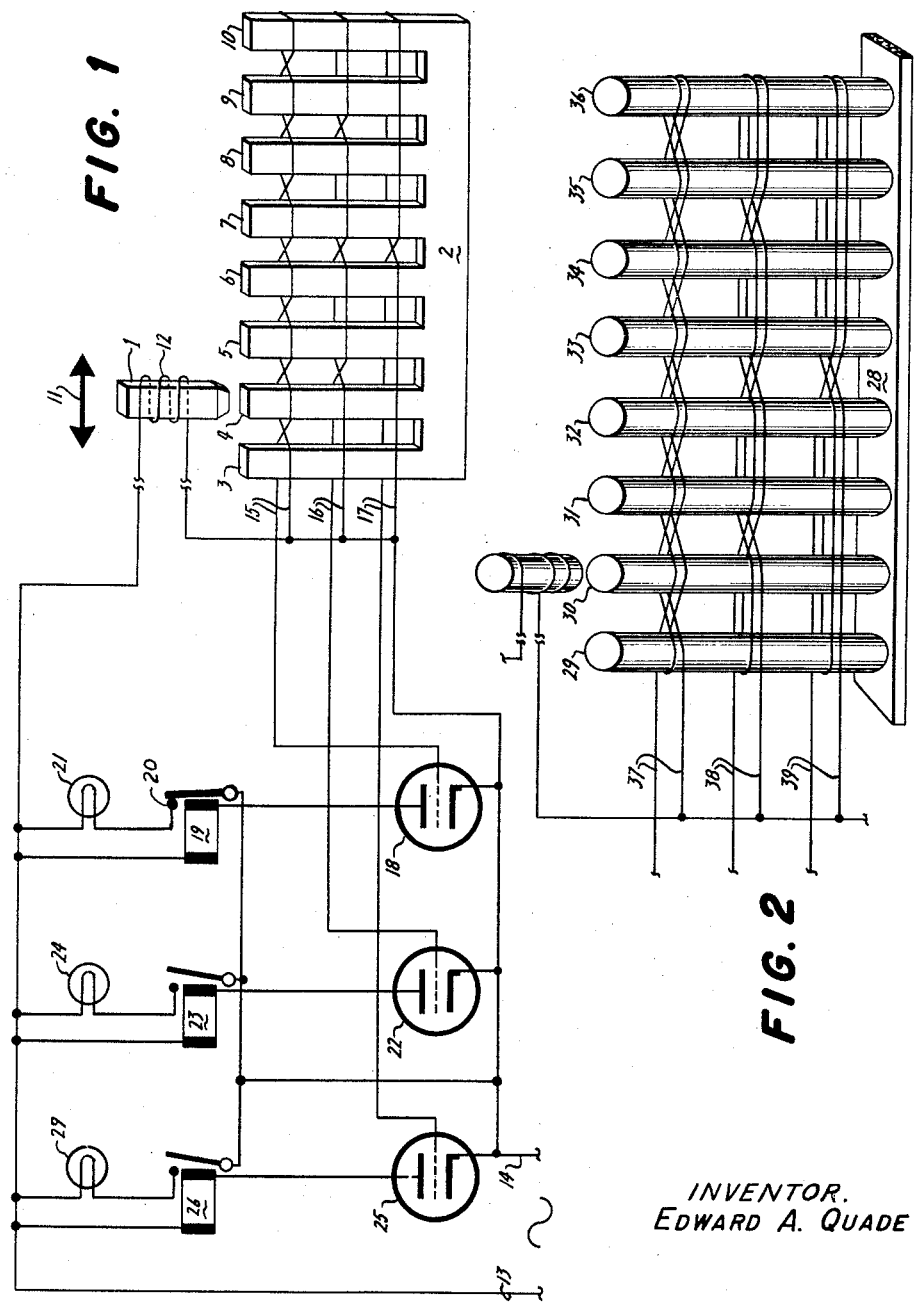
INVENTOR.
EDWARD A. QUADE
BY: Lippincott and Smith
ATTORNEYS March 29, 1960     E. A. QUADE     2,931,023
DIGITAL POSITION INDICATOR Filed Feb. 14, 1955     2 Sheets-Sheet 2

INVENTOR.
EDWARD A. QUADE
BY: Lippincott and Smith
ATTORNEYS

United States Patent Office 2,931,023
Patented Mar. 29, 1960

2,931,023

DIGITAL POSITION INDICATOR

Edward A. Quade, San Jose, Calif., assignor to International Business Machines Corporation, New York, N.Y., a corporation of New York Application February 14, 1955, Serial No. 488,008

10 Claims. (Cl. 340—347)

This invention relates to position indicators, and more particularly to improved apparatus for producing and transmitting in digital form electric signals representing the linear or angular position of a movable member. The principal objects of the invention are to provide improved position indicators with direct reading digital outputs, to provide such indicators which are adaptable to both linear and angular measuring applications, to eliminate errors due to stray-field effects, and to provide positions indicators having reading unit elements which may be made very small.

Briefly stated, in accordance with one aspect of this invention, the novel position indicator has a transformer-type reading unit including two magnetic core members, at least one of which is movable relative to the other. The first core member carries a primary winding for producing alternating magnetic flux, and the second core member has a plurality of alined teeth about which secondaries are wound in a manner hereinafter described. By relative movement of the two core members, the first core member can be positioned adjacent to any one of the second member's teeth, selectively, whereupon voltages are induced in those portions of the secondaries wound upon that tooth. Each secondary is wound in different directions about different ones of the teeth, so that a unique combination of plus-phased and minus-phased induced voltages is provided for each incremental unit in the relative positions of the two core members.

Figure 3:
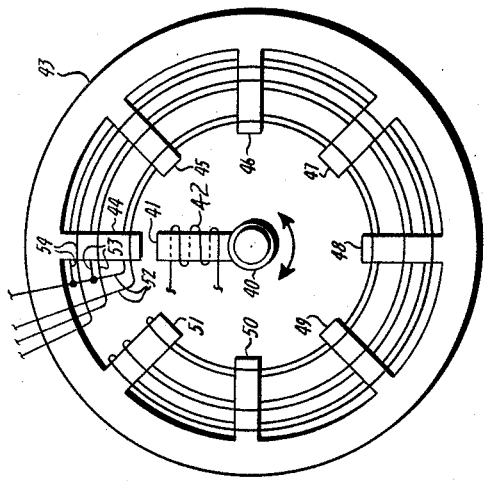
Figure 4:
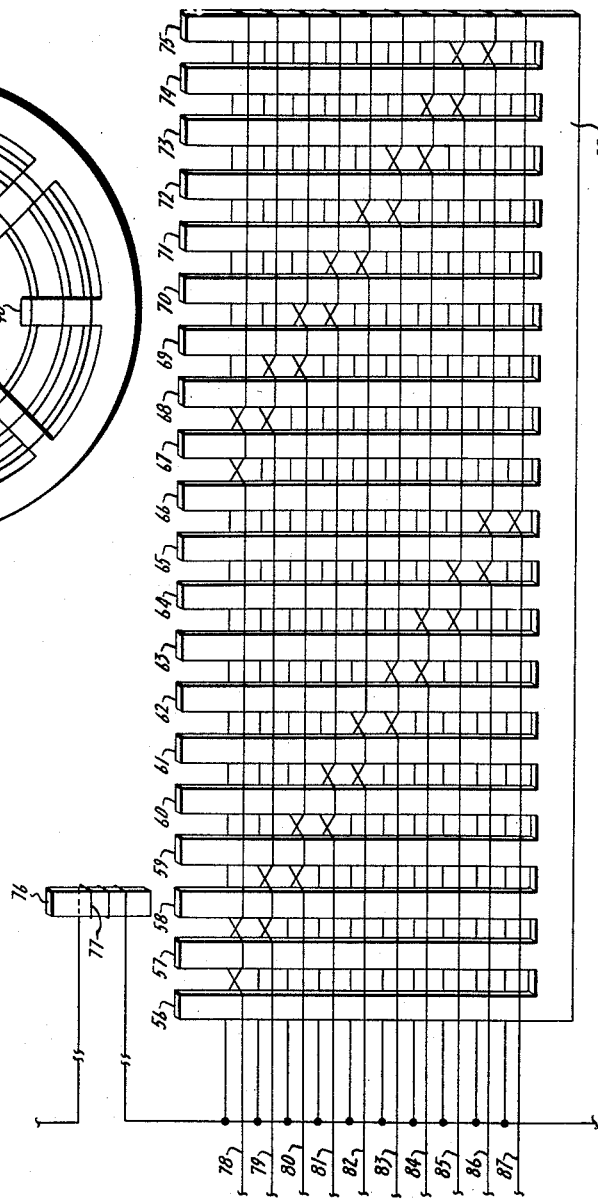

The invention will be better understood from the following description taken in connection with the accompanying drawings, and its scope will be pointed out in the appended claims. In the drawings, Fig. 1 is a schematic diagram illustrating one embodiment of the invention arranged to represent linear position by electric signals coded in the binary number system, Figure 2 is a schematic diagram illustrating a modification of the transformer-type reading unit, Fig. 3 is a schematic diagram showing another modification of the reading unit adapted to angular measuring applications, and Fig. 4 is a schematic diagram of a reading unit for providing electric signals coded in the decimal number system.

Referring now to Fig. 1 of the drawings, the transformer-type reading unit includes a movable magnetic core member 1 and a stationary magnetic core member 2. Core member 2 is slotted, as shown, to form a plurality of linearly alined teeth, identified in the drawing by reference numerals 3 through 10, inclusive. Member 1 is movable from left to right and from right to left, selectively, as indicated by arrow 11, so that member 1 may be positioned adjacent to any one of the teeth 3–10, selectively. In a typical application, core member 1 is attached to a movable part, the position of which is to be indicated, and electric signals are provided in a manner hereinafter more fully explained, which are coded to identify the tooth of member 2 which is most nearly adjacent to member 1.

Core member 1 carries a primary winding 12, to which alternating current is supplied from any suitable source through leads 13 and 14. This provides alternating magnetic flux which passes through member 1 and also through the adjacent tooth of member 2. Preferably, core member 1 and each of the teeth 3–10, are substantially the same width, so that when member 1 is directly adjacent to one of the teeth, only that tooth is in substantial flux-linking relation with member 1 and the primary winding 12. Accordingly, alternating magnetic flux is provided through the eight teeth 3–10 selectively, depending upon the linear position of member 1 and any movable part to which member 1 may be attached.

A secondary 15 is formed by weaving a wire from left to right in front of the odd numbered teeth, 3, 5, 7 and 9, and behind the even numbered teeth, 2, 4, 6 and 10; then from right to left in front of the even numbered teeth and behind the odd numbered teeth, as is shown in the drawing. This is equivalent to a single turn winding in one direction about each of the odd numbered teeth and in the opposite direction about each of the even numbered teeth. Another secondary 16 is wound in the same manner, except that the winding is in one direction about the first and third pairs of teeth and in the opposite direction about the second and fourth pairs of teeth. A third secondary 17 is wound in one direction about the first four teeth and in the opposite direction about the last four teeth. It may be noted that each of the eight teeth is unique with respect to the combination of winding directions of the three secondaries thereon.

Assume now that core member 1 is directly adjacent to tooth 3, so that those portions of the three secondaries wound about tooth 3 are in flux-linking relation with primary winding 12. The winding directions about tooth 3 are such that the three voltages induced in secondaries 15, 16 and 17, respectively, are 180 degrees out-of-phase with the supply voltage across primary winding 12. For convenience, voltages which are opposite in phase to the supply voltage are herein referred to as "minus-phased" while voltages which are in phase with the supply voltage are referred to as "plus phased." Accordingly it will be noted that all of the secondary voltages are minus-phased when member 1 is adjacent to tooth 3.

Now assume that core member 1 is positioned adjacent to tooth 4. Since secondary 15 is wound in the opposite direction about tooth 4, the induced voltage in this secondary is now plus-phased, while the induced voltages in secondaries 16 and 17 remain minus-phased. As member 1 is successively positioned adjacent to each of the other teeth, it will be found that each incremental unit position of member 1 provides a different combination of plus-phased and minus-phased secondary voltages, which uniquely identifies the position of member 1. If a plus-phased voltage is represented by the binary number "1" and a minus-phased voltage is represented by a "0," each combination of the secondary voltages can be represented by a three-place binary number, as in the following table in which the three binary bits, reading from left to right, represent the voltage phases in secondary windings 17, 16 and 15, respectively.

| Adjacent Tooth | Binary Number | Corresponding Decimal No. |
|---|---|---|
| 3 | 000 | 0 |
| 4 | 001 | 1 |
| 5 | 010 | 2 |
| 6 | 011 | 3 |
| 7 | 100 | 4 |
| 8 | 101 | 5 |
| 9 | 110 | 6 |
| 10 | 111 | 7 |

If desired, the plus-phased and minus-phased voltage signals may be converted into electric signals of other types. For example, in the embodiment shown in Fig. 1, secondary 15 is connected to the control grid of a vacuum tube 18. The plate of tube 18 is connected through a relay 19 to voltage supply lead 13, and the cathode tube 18 is connected to voltage supply lead 14. Consequently, the plus-phased supply voltage is applied between the plate and cathode of the vacuum tube. When the voltage induced in secondary 15 is minus-phased, the control grid of tube 18 is negative whenever its plate is positive, and no substantial conduction through the tube occurs. On the other hand, when a plus-phased voltage is induced in secondary 15, vacuum tube 18 is fully conductive during one-half of each supply voltage cycle, whereby relay 19 is energized to close relay contact 20. This completes an electric circuit to perform any desired function, such as the illumination of signal lamp 21.

In a similar manner, when a plus-phased voltage is induced in secondary 16, vacuum tube 22 conducts sufficient current to energize relay 23 and complete an electric circuit which illuminates signal lamp 24. When a plus-phase voltage is induced in secondary 17, vacuum tube 25 conducts sufficient current to energize relay 26 and thereby complete a circuit which illuminates signal lamp 27. Signal lamps 21, 24 and 27 indicate the values of the right-hand, center, and left-hand bits, respectively, of the three-place binary number which represents the position of member 1, the binary numeral one being indicated by a lighted lamp and zero being indicated by an unlighted lamp.

The apparatus described indicates the position of member 1 to a degree of accuracy which depends chiefly upon the spacing between the teeth of member 2 since, in general, member 1 must be moved a unit distance from one tooth to the next to produce a change of indication. In this connection the simplicity of the transformer-type reading unit described, and the method of forming secondary windings by weaving wires in front of and behind successive teeth, are especially advantageous since they make it possible for the reading units to be made in small sizes, with very closely spaced teeth, whereby exceptionally high accuracy may be obtained. It will, of course, be understood that the invention is not limited to an eight position indicator since the number of unit positions can be extended by adding additional teeth and secondaries. For example, if member 2 is provided with sixteen teeth and four secondaries, sixteen different positions of member 1 can be indicated by four induced voltages representing a four-place binary number.

Another important advantage of the reading unit described is its freedom from adverse effects produced by stray electromagnetic fields. The stray fields commonly responsible for troublesome undesired induced voltages produce substantially equal and in-phase fluxes through every tooth of core member 2. Since each secondary is wound in one direction about exactly one-half of the teeth, and is wound in the opposite direction about the other one-half of the teeth, stray fields induce substantially equal and bucking voltages in different parts of each secondary, and the net voltage induced in each secondary by stray fields is negligibly small.

Fig. 2 illustrates a modification of the transformer-type reading unit which is especially useful in applications where the reading unit must be exceptionally small. Stationary magnetic core member 28, which may replace member 2 of Fig. 1, has a plurality of teeth identified in the drawing by reference number 29 through 36, inclusive. Each of the teeth 29–36 preferably is a right circular cylinder of magnetic material, and may consist of a short length of iron wire supported by the base of member 28. Using small wires for teeth, magnetic core members with very closely spaced teeth can be fabricated easily and economically. In addition, the cylindrical shape of the teeth provides a relatively large amount of winding space for secondaries 37, 38 and 39.

Each of the secondaries, 37, 38 and 39 is wound in the manner previously described, except that two left to right and right to left weaving operations are performed for each secondary, so that each secondary has the equivalent of two turns about each core tooth. Consequently the induced secondary voltages have substantially twice the magnitude which would be obtained with single turn windings. In a similar manner, any number of additional turns may be added to each secondary, with proportionate increases in the magnitudes of the secondary voltages, within the limitations of the winding space available.

Since linkage flux problems may limit the depth of the slots between adjacent teeth, it may sometimes be found that one stationary magnetic core member does not provide sufficient winding space for all of the windings desired. In this case, one or more additional stationary core members may be placed adjacent and parallel to the first, so that magnetic flux produced by the primary winding passes through respective teeth of both core numbers, and the secondaries may then be divided in any convenient manner between the two core numbers. To provide good flux linkage with all of the parallel teeth, the thickness of movable core member 1 may be made equal to or greater than the combined thickness of the parallel stationary core members.

Fig. 3 illustrates a modified reading unit adapted to indicate the angular position of a rotatable shaft 40. The movable magnetic core member 41 is attached to and extends radially outward from shaft 40, as shown, and carries the primary winding 42 which is supplied with alternating current through slip rings or other suitable means. The stationary magnetic core number 43 has a plurality of teeth, indicated by reference numerals 44 through 51 inclusive, which extend radially inward, as shown, so that alternating magnetic flux produced by primary winding 42 passes through different ones of the teeth 44–51, selectively, as shaft 40 is rotated to different angular positions. Secondary windings 52, 53 and 54, similar to those previously described, are provided to produce unique combinations of plus-phase and minus-phased voltages for each of eight different unit angular positions of shaft 40.

In its broader aspects this invention is not limited to the production of electric signals coded according to the code and number system hereinbefore described, since other codes and number systems may be employed by varying the secondary winding arrangement. For example, to avoid interunit ambiguities—that is, ambiguous indications when the movable core number is positioned midway between two adjacent teeth of the stationary core number—the well-known Gray code or an equivalent may be employed. Also, other number systems, such as the decimal system, may be used.

Fig. 4 illustrates a reading unit arranged to indicate twenty different linear positions by electric signals coded according to the decimal number system. Stationary core number 55 has twenty alined teeth, identified in the drawing by reference numerals 56 through 75, inclusive. The movable core number 76, which carries primary winding 77, may be positioned adjacent to any one of the twenty teeth, selectively. Ten secondaries, respectively identified in the drawing by reference numerals 78 through 87, inclusive, are wound in the manner illustrated so that when member 76 is adjacent to tooth 56 all of the induced secondary voltages are minus-phased. This may be considered to represent "0" in the decimal system. When member 76 is positioned adjacent to tooth 57 a plus-phased voltage is induced only in secondary 78, which may represent the number "1." When member 76 is adjacent to tooth 58, the plus-phased voltage is induced only in secondary 79, which may represent the number "2." In like manner, as member 76 is moved adjacent to each succeeding tooth of the first group of ten teeth, the plus-phased induced voltage moves to the next succeeding secondary and thereby represents the next succeeding decimal digit.

When member 76 is positioned adjacent to tooth 66 only the voltage in secondary 87 is plus-phased, which represents the number "10" in the decimal system. As member 76 is moved adjacent to each succeeding tooth in the second group of ten teeth, the voltage induced in secondary 87 continues plus-phased to indicate digit "1" in the tens column of a two-place decimal number, while the units column digit is represented by a plus-phased voltage in respective ones of the other secondaries. Accordingly, when member 76 is positioned adjacent to tooth 67 the induced voltages in secondaries 78 and 87 are both plus-phase, so that the decimal number "11" is represented. As member 76 is moved adjacent to succeeding teeth the induced voltage in secondary 87 remains plus-phased while the other plus-phased voltage shifts from one secondary to the next to represent the numbers "12" through "19."

It will be noted that each of the secondaries 78–86 is wound in one direction about eighteen of the teeth and in the opposite direction about only two of the teeth. For best balance against stray field effects, the windings may be modified to provide nine turns in the plus-phased direction about two of the teeth to each one turn in the minus-phased direction about the other eighteen teeth. In addition to balancing out stray-field effects this winding arrangement will provide large plus-phased secondary voltages and relatively small minus-phased voltages, which may be advantageous in some applications.

It will be understood that this invention is not limited to specific embodiments herein illustrated and described, and that the following claims are intended to cover all changes and modifications which do not depart from the true spirit and scope of the invention.

What is claimed as new and desired to secure by Letters Patent of the United States is:

1. Apparatus for transmitting in digital form electric signals representing the position of a movable member, comprising first and second magnetic core members, at least one of which is movable relative to the other, means including a primary winding for producing alternating magnetic flux through said first core member, said second core member having at least two teeth which may be brought selectively into flux-linking relation with said first core member, a secondary wound in one direction about a first one of said teeth and in the opposite direction about a second one of said teeth, so that a voltage is induced in said secondary which has one phase when said first tooth is in flux-linking relation with said first core member and has the opposite phase when said second tooth is in flux-linking relation with said first core member, and electrical signaling means controlled by the phase of said induced voltage.

2. Apparatus for transmitting in digital form electric signals representing the position of a movable number, comprising first and second magnetic core members at least one of which is movable relative to the other, means including a primary winding for producing alternating magnetic flux through said first core member, said second core member having at least two teeth which may be brought selectively into flux-linking relation with said first core member, a secondary wound in one direction about a first one of said teeth and in the opposite direction about a second one of said teeth, so that a voltage is induced in said secondary which has one phase when said first tooth is in flux-linking relation with said first core member and has the opposite phase when said second tooth is in flux-linking relation with said first core member, and means closing an electric circuit when said induced voltage is of one phase and opening said electric circuit when said induced voltage is of the opposite phase.

3. Apparatus for transmitting in digital form electric signals representing the position of a movable member, comprising first and second magnetic core members, at least one of which is movable relative to the other, means including a primary winding for producing alternating magnetic flux through said first core member, said second core number being slotted to form a plurality of alined teeth which may be brought selectively adjacent to and in flux-linking relation with said first core member by relative movement of said core members, said first core member and each of said teeth being of substantially the same width, and a secondary wound in one direction about at least one of said teeth and wound in the opposite direction about the remaining ones of said teeth, so that a voltage is induced in said secondary which has one phase for certain relative positions of said two core members and has the opposite phase for other relative positions of said core members.

4. A position transmitter comprising a first core member, means for producing an alternating magnetic flux through said first core member, a second core member having a plurality of alined teeth, said first core member being movable relative to said second core member to selective positions adjacent to respective ones of said teeth, a first secondary wound in one direction about alternate ones of said teeth and wound in the opposite direction about the remaining ones of said teeth, and a second secondary wound in one direction about alternate pairs of said teeth and wound in opposite directions about the remaining pairs of said teeth.

5. A position transmitter comprising a first core member, means for producing alternating magnetic flux through said first core member, a second core member having a plurality of alined teeth, said first core member being movable relative to said second core member to selective positions adjacent to respective ones of said teeth, and a secondary wound in one direction about alternate ones of said teeth and wound in the opposite direction about the remaining ones of said teeth, said secondary being formed of a wire woven alternately in front of and behind adjacent ones of said teeth.

6. A position transmitter comprising a first core member, means producing an alternating magnetic flux through said first core member, a second core member having a plurality of alined teeth, said first core member being movable relative to said second core member to selective positions adjacent to respective ones of said teeth, and a plurality of secondaries each wound in a first direction about different respective ones of said teeth and wound in the opposite direction about the other ones of said teeth.

7. A position transmitter comprising a first core having a magnetic pole, a primary wound on said first core, means for supplying a time-varying electric current through said primary to produce a time-varying magnetic flux emanating from said pole of the first core, a second core having a plurality of magnetic poles, one of said cores being movable relative to the other so that said pole of the first core comes into magnetic flux-linking relation with each of said poles of the second core substantially one at a time, a plurality of secondaries wound on said second core in magnetically coupled relation to each pole thereof so that said time-varying flux induces voltages in each of said secondaries, said secondaries having a different combination of polarities with respect to each of said poles of the second core so that the phase relations of said voltages to said current are uniquely different for different relative positions of said cores.

8. A position transmitter comprising a first magnetic core, a primary wound on said first core, means for supplying a time-varying electric current through said primary to produce a time-varying magnetic flux, a second magnetic core having a plurality of teeth, one of said cores being movable selectively to a plurality of positions relative to the other core, said first core being adjacent to and in substantial magnetic flux-linking relation with a different one of said teeth at each of said positions, a plurality of secondaries each wound about each of said teeth so that said time-varying flux induces voltages in each of said secondaries simultaneously, the winding polarities of said secondaries on said teeth forming polarity combinations that are different for each of said teeth so that the instantaneous polarity relations of said voltages form combinations that are uniquely related to different ones of said positions.

9. Apparatus for displaying digital representations of variable positions, comprising a first magnetic core, a primary wound on said first core, means for supplying an alternating electric current through said primary to produce an alternating magnetic flux, a second magnetic core having a plurality of teeth, one of said cores being movable selectively to a plurality of positions relative to the other core, said first core being adjacent to and in substantial flux-linking relation with a different one of said teeth at each of said positions, a first secondary wound on each of said teeth and having a winding polarity that reverses for each successive one of the teeth, a second secondary wound on each of said teeth and having a winding polarity that reverses for each successive pair of said teeth, a third secondary wound on each of said teeth and having a winding polarity that reverses for each successive four of said teeth, so that said time-varying flux induces voltages in each of said secondaries simultaneously, said voltages having eight different combinations of phase relations to said current at eight different ones of said positions, and means responsive to said phase relations for producing a digital display representing the relative positions of said cores.

10. Apparatus for transmitting in digital form electric signals representing the position of a movable member, comprising first and second magnetic cores, a primary wound on said first core, means for supplying an alternating electric current through said primary to produce an alternating magnetic flux, said second core having a plurality of teeth, one of said cores being movable selectively to a plurality of positions relative to the other core, said first core being adjacent to and in substantial magnetic flux-linking relation with a different one of said teeth at each of said positions, a plurality of secondaries wound on said teeth so that voltages are induced in said secondaries by said flux that have a different combination of phase relations to said current at each of said positions, and means responsive to said phase relations for providing a plurality of electric signals representing the position in digital form, each of said signals having either one of two fixed values, selectively, depending upon the phase polarity of a respective one of said induced voltages relative to said current.

References Cited in the file of this patent

UNITED STATES PATENTS

| | | |
|---|---|---|
| 739,572 | Armstrong | Sept. 22, 1903 |
| 1,102,990 | Marconi | July 7, 1914 |
| 1,972,987 | Gardeen | Sept. 11, 1934 |
| 2,435,276 | Holmes | Feb. 3, 1948 |
| 2,508,526 | Marrison | May 23, 1950 |
| 2,602,660 | Shannon | July 8, 1952 |
| 2,672,605 | Taylor | Mar. 16, 1954 |
| 2,717,371 | Bruene | Sept. 6, 1955 |
| 2,733,860 | Rajchman | Feb. 7, 1956 |
| 2,734,182 | Rajchman | Feb. 7, 1956 |
| 2,736,881 | Booth | Feb. 28, 1956 |
| 2,882,524 | Spencer | Apr. 14, 1959 |

FOREIGN PATENTS

| | | |
|---|---|---|
| 1,071,210 | France | Nov. 3, 1954 |